(12) United States Patent
Akkarakaran et al.

(10) Patent No.: US 10,512,050 B2
(45) Date of Patent: Dec. 17, 2019

(54) SYNCHRONIZATION AND BROADCAST CHANNEL DESIGN WITH FLEXIBLE BANDWIDTH ALLOCATIONS

(71) Applicant: QUALCOMM Incorporated, San Diego, CA (US)

(72) Inventors: Sony Akkarakaran, Poway, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/726,345

(22) Filed: Oct. 5, 2017

(65) Prior Publication Data
US 2018/0103445 A1   Apr. 12, 2018

Related U.S. Application Data

(60) Provisional application No. 62/405,860, filed on Oct. 7, 2016.

(51) Int. Cl.
*H04W 56/00* (2009.01)
*H04J 11/00* (2006.01)
*H04J 3/06* (2006.01)
*H04L 5/00* (2006.01)
(Continued)

(52) U.S. Cl.
CPC ............ *H04W 56/001* (2013.01); *H04J 3/06* (2013.01); *H04J 11/00* (2013.01); *H04J 11/0083* (2013.01); *H04L 5/0048* (2013.01); *H04W 72/005* (2013.01); *H04W 88/02* (2013.01)

(58) Field of Classification Search
None
See application file for complete search history.

(56) References Cited

U.S. PATENT DOCUMENTS

| 2014/0126498 | A1  | 5/2014 | Koorapaty et al. |
| 2014/0286286 | A1* | 9/2014 | Yamazaki ............ H04W 56/00 370/329 |
| 2015/0085793 | A1  | 3/2015 | Luo et al. |

(Continued)

FOREIGN PATENT DOCUMENTS

CN   103458529 A   12/2013

OTHER PUBLICATIONS

<Span style="font-family: calibri;">3GPP TR 36.740 V1.0.0: 3rd Generation Partnership Project, Technical Specification Group 3rd Generation Partnership Project; Technical Specification Group Radio Access Network; Evolved Universal Terrestrial Radio Access (E-UTRA); Study on LTE bandwidth flexibility enhancements (Release 14), Jun. 2016, pp. 1-19.

(Continued)

*Primary Examiner* — Kodzovi Acolatse
(74) *Attorney, Agent, or Firm* — Qualcomm IP Dept.; James Hunt Yancey, Jr.

(57) ABSTRACT

Certain aspects of the present disclosure provide various synchronization channel and physical broadcast channel (PBCH) designs. A method for wireless communications by a user equipment (UE). The UE detects a synchronization channel and a secondary synchronization signal (SSS) transmitted with the synchronization channel. The UE demodulates a PBCH based on the SSS and determines system bandwidth corresponding to the downlink bandwidth based at least in part the PBCH.

22 Claims, 13 Drawing Sheets

(51) Int. Cl.
*H04W 72/00* (2009.01)
*H04W 88/02* (2009.01)

(56) References Cited

U.S. PATENT DOCUMENTS

| | | | | |
|---|---|---|---|---|
| 2015/0296518 | A1* | 10/2015 | Yi | H04L 1/08 370/336 |
| 2015/0373668 | A1* | 12/2015 | Lee | H04W 72/042 370/329 |
| 2016/0072614 | A1 | 3/2016 | Blankenship et al. | |
| 2016/0105803 | A1 | 4/2016 | Sakhnini et al. | |
| 2017/0195889 | A1* | 7/2017 | Takeda | H04W 16/14 |
| 2017/0265156 | A1* | 9/2017 | Xue | H04W 56/001 |
| 2017/0359791 | A1* | 12/2017 | Onggosanusi | H04L 5/0023 |
| 2018/0048445 | A1* | 2/2018 | Jung | H04L 5/0048 |
| 2018/0098298 | A1* | 4/2018 | Jung | H04L 27/266 |
| 2018/0212726 | A1* | 7/2018 | Xue | H04L 27/26 |
| 2018/0255524 | A1* | 9/2018 | Wu | H04W 56/00 |

OTHER PUBLICATIONS

<Span style="font-family: calibri;">HUAWEI: "Support of Flexible Bandwidth", R1-166106, 3GPP TSG RAN WG1 Meeting #86, 8.1.3.2, Gothenburg, Sweden, Aug. 22-26, 2016, pp. 1-6.
<Span style="font-family: calibri;">Wang Y.P.E., et al., "A Primer on 3GPP Narrowband Internet of Things (NB-IoT)", Jun. 2016, pp. 1-8.
International Search Report and Written Opinion—PCT/US2017/055630—ISA/EPO—dated Feb. 22, 2018.
Qualcomm Incorporated: "Single Beam PBCH Design Considerations", 3GPP Draft; R1-1610157, Single_Beam_PBCH_Design, 3rd Generation Partnership Project (3GPP), Mobile Competence Centre; 650, Route Des Lucioles; F-06921 Sophia-Antipolis Cedex; France, vol. RAN WG1, No. Lisbon, Portugal, Sep. 10, 2016-Sep. 14, 2016, Oct. 1, 2016 (Oct. 1, 2016), XP051159960, Retrieved from the Internet: URL:http://www.3gpp.org/ftp/tsg_ran/WG1_RL1/TSGR1_86b/Docs/, 3 pages, [retrieved on Oct. 1, 2016].

* cited by examiner

Sync centered RS sequence design

SYNCHRONIZATION AND BROADCAST CHANNEL DESIGN WITH FLEXIBLE BANDWIDTH ALLOCATIONS

CROSS-REFERENCE TO RELATED APPLICATION & PRIORITY CLAIM

This application claims benefit of and priority to U.S. Provisional Patent Application Ser. No. 62/405,860, filed Oct. 7, 2016, which is herein incorporated by reference in its entirety for all applicable purposes.

TECHNICAL FIELD

Aspects of the present disclosure relate generally to wireless communications systems, and more particularly, to synchronization and broadcast channel design for certain systems, such as new radio (NR) systems, that may use flexible bandwidth allocations and/or synchronization channels not centered around a DC tone.

INTRODUCTION

Wireless communication systems are widely deployed to provide various telecommunication services such as telephony, video, data, data, messaging, broadcasts, etc. The systems may employ multiple-access technologies capable of supporting communication with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In LTE or LTE-A network, a set of one or more base stations may define an e NodeB (eNB). In other examples (e.g., in a NR, next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, a Next Generation Node B (gNB), etc.). BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to techniques for synchronization and broadcast channel design and signaling.

Certain aspects of the present disclosure provide a method for wireless communications by a user equipment (UE). The method generally includes detecting a synchronization channel and a secondary synchronization signal (SSS) transmitted with the synchronization channel. The UE demodulates a physical broadcast channel (PBCH) based on the SSS. The UE determines system bandwidth corresponding to the downlink bandwidth based at least in part on the PBCH.

Certain aspects of the present disclosure provide an apparatus for wireless communications, such as a UE. The apparatus generally includes means for detecting a synchronization channel and a SSS transmitted with the synchronization channel. The apparatus demodulates a PBCH based on the SSS. The apparatus determines system bandwidth corresponding to the downlink bandwidth based at least in part on the PBCH.

Certain aspects of the present disclosure provide an apparatus for wireless communications, such as a UE. The apparatus generally includes at least one processor coupled with a memory and configured to detect a synchronization channel and a SSS transmitted with the synchronization channel. The at least one processor demodulates a PBCH based on the SSS. The at least one processor determines system bandwidth corresponding to the downlink bandwidth based at least in part on the PBCH.

Certain aspects of the present disclosure provide a computer readable medium having computer executable code stored thereon for wireless communications, such as by a UE. The computer readable medium generally includes code for detecting a synchronization channel and a SSS transmitted with the synchronization channel. The computer readable medium includes code for demodulating a PBCH based on the SSS and determining system bandwidth corresponding to the downlink bandwidth based at least in part on the PBCH.

Certain aspects of the present disclosure also provide a method for wireless communications by a base station that may be considered complementary to the UE operations above (e.g., for generating the synchronization and PBCH channels detected and read by the UE).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
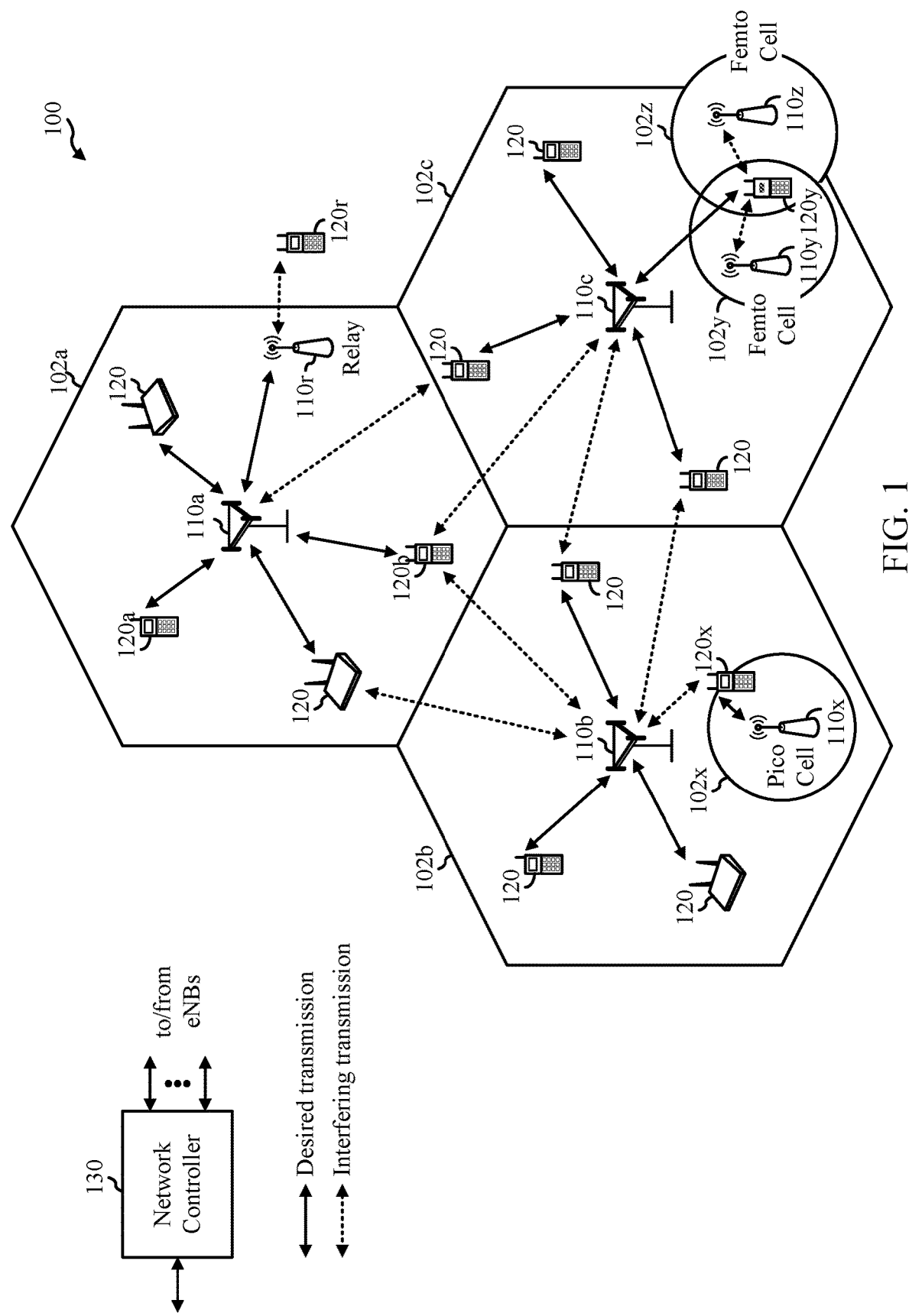
FIG. 1 is a block diagram conceptually illustrating an example telecommunications system, in accordance with certain aspects of the present disclosure.

Aspects of the present disclosure provide apparatus, methods, processing systems, and computer readable mediums for operations that may be performed in NR applications (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g., 27 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

In certain systems, such as long term evolution (LTE), the synchronization channel (e.g., carrying primary synchronization signal (PSS), secondary synchronization signal (SSS), and physical broadcast channel (PBSCH)) are centered around the direct current (DC) tone (carrier) of the system bandwidth and may include system information for a user equipment (UE). The DC tone is a null tone that helps the UE locate the center of the system bandwidth. The cell-specific reference signal (CRS) is also centered around the DC tone. Thus, even before the UE gets downlink bandwidth information from the PBCH, the UE can determine the CRS sequence centered around the DC tone and the CRS can be used to demodulate the PBCH. Once the PBCH is received, the UE can use the downlink bandwidth information for a random access channel (RACH) procedure with the cell.

In some systems (e.g., NR, unlicensed/shared spectrum, narrowband Internet-of-Things (NB-IoT)), however, the synchronization channel and/or CRS may not be centered around the DC tone. Thus, designs for the signaling are desirable, which will allow the UE to receive/demodulate the PBCH and to obtain the system information, even when the UE does not know the downlink bandwidth and the locations may not be centered around the DC tone.

Aspects of the present disclosure provide synchronization and broadcast designs that may be used for flexible bandwidth allocations. In one example, PBCH is demodulated with a secondary synchronization signal (SSS). In another example, PBCH is demodulated with a measurement reference signal (MRS), which could, for example, be a CSI-RS. In another example, the offset of the synchronization channel with respect to the DC tone is signaled to the UE. In yet another example, the UE performs multiple hypothesis PNCH decoding.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network 100 may be a new radio (NR) or 5G network and may utilize synchronization and broadcast channel designs presented herein. For example, the synchronization and broadcast channel designs may use flexible bandwidth allocations and may not be centered around the DC tone of the system bandwidth. UEs 120 may be configured to perform the operations 1000 and other methods described herein and discussed in more detail below. For example, UE 120 can detect a synchronization channel and a secondary synchronization signal (SSS) transmitted with the synchronization channel. The UE 120 may demodulate a physical broadcast channel (PBCH) using the SSS to obtain system information such as the downlink bandwidth.

As illustrated in FIG. 1, the wireless network 100 may include a number of base station (BSs) 110 and other network entities. A BS may be a station that communicates with UEs. Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell", BS, Next Generation Node B (gNB), Node B, 5G NB, access point (AP), NR BS, NR BS, or transmission reception (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a resource block (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of two half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16, . . . slots) depending on the tone-spacing (e.g., 15, 30, 60, 120, 240 . . . kHz).

Beamforming generally refers to the use of multiple antennas to control the direction of a wavefront by appropriately weighting the magnitude and phase of individual antenna signals (for transmit beamforming). Beamforming may result in enhanced coverage, as each antenna in the array may make a contribution to the steered signal, an array gain (or beamforming gain) is achieved. Receive beamforming makes it possible to determine the direction that the wavefront will arrive (direction of arrival, or DoA). It may also be possible to suppress selected interfering signals by applying a beam pattern null in the direction of the interfering signal. Adaptive beamforming refers to the technique of continually applying beamforming to a moving receiver.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
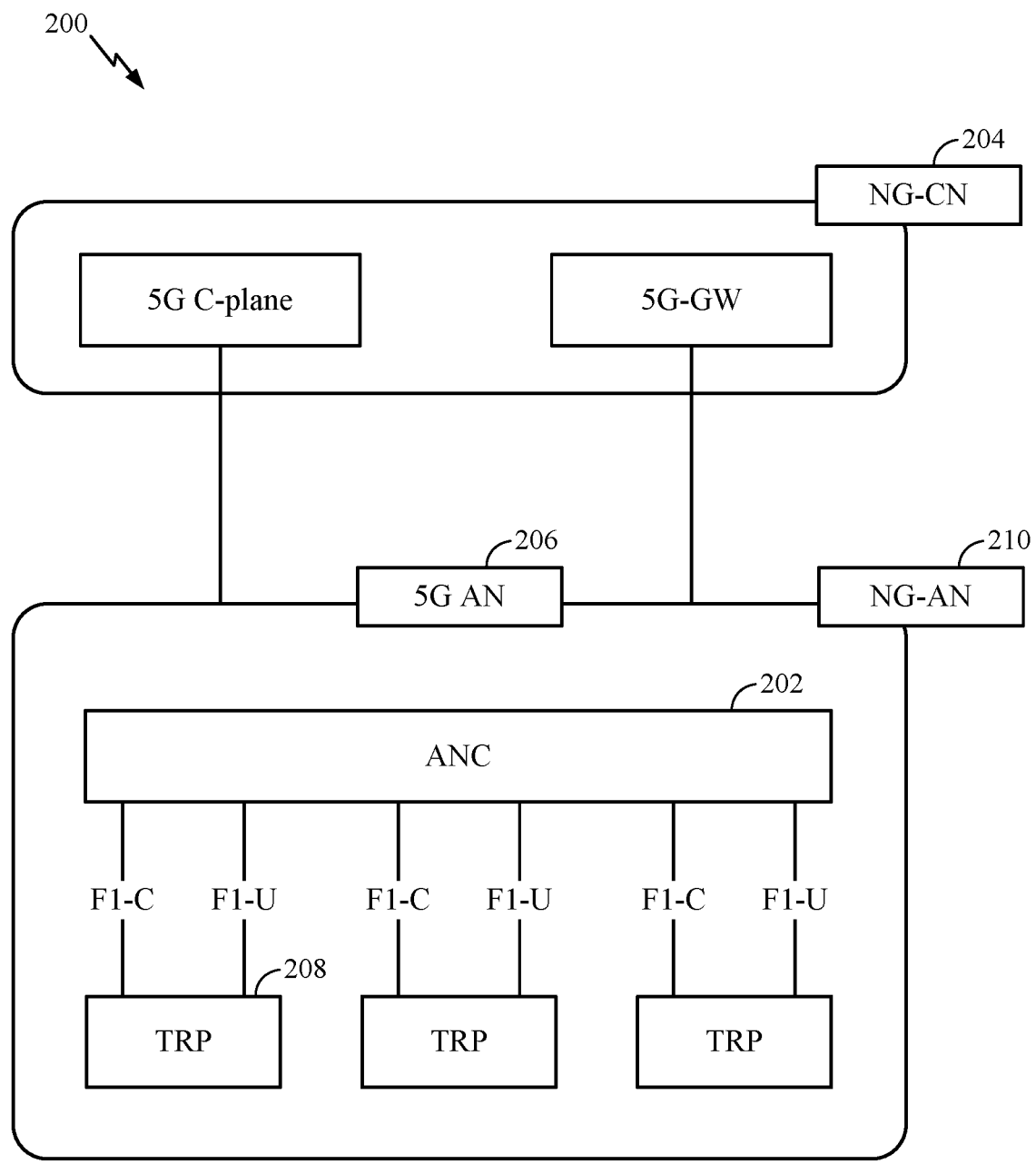
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as BSs, NR BSs, Node Bs, gNBs, 5G NBs, APs, or some other term). As described above, a TRP may be used interchangeably with "cell."

The TRPs 208 may be a DU. The TRPs 208 may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR.

The logical architecture may enable cooperation between and among TRPs 208. For example, cooperation may be preset within a TRP and/or across TRPs via the ANC 202. An inter-TRP interface may not be used.

The logical architecture may support a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). A BS may include a central unit (CU) (e.g., ANC 202) and/or one or more distributed units (e.g., one or more TRPs 208).

Figure 3:
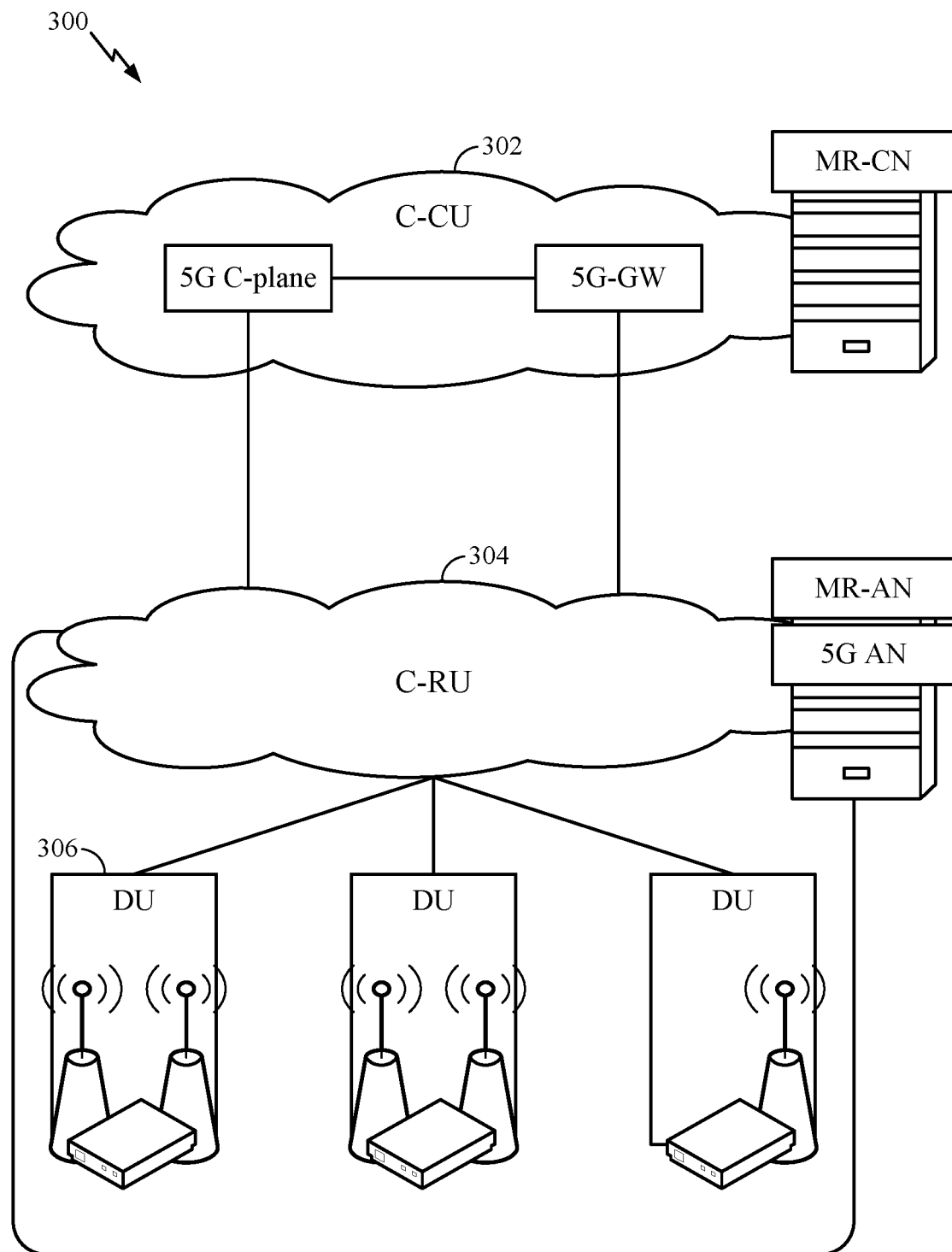
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. The C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU 306 may be located at edges of the network with radio frequency (RF) functionality.

Figure 4:
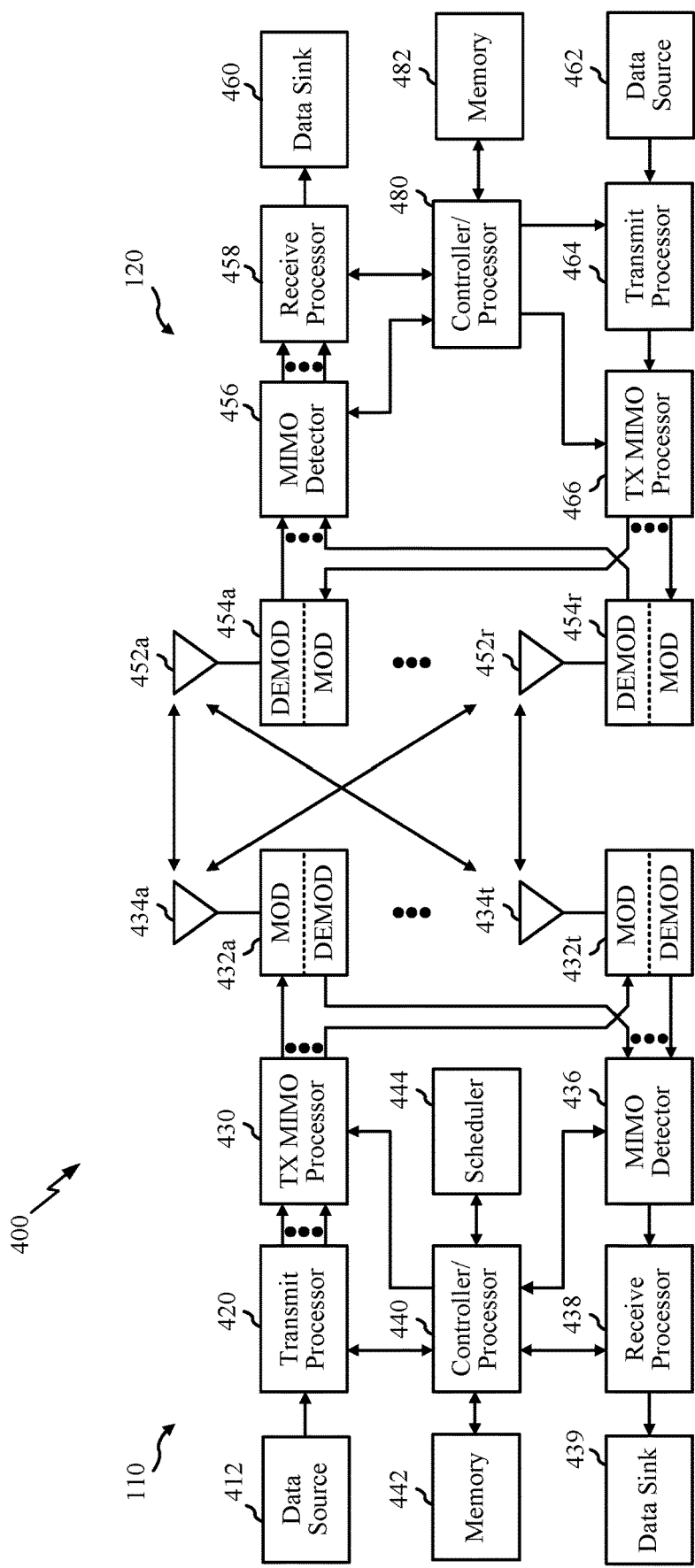
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. For example, UE 120 and BS 110 may be configured to perform SSS based PBCH demodulation for flexible bandwidth allocation of synchronization and broadcast signals not centered around the DC tone, and procedures described herein (e.g., with reference to FIG. 10).

As described above, the BS 110 may be a gNB, TRP, etc. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 10-12.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for a primary synchronization signal (PSS), primary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively. As described in more detail below, in some cases, synchronization, reference signals, and broadcast signals may have a flexible bandwidth allocation and may not be centered around the DC tone.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct, e.g., the execution of the functional blocks illustrated in FIG. 10, and/or other processes for the techniques described herein. processes for the techniques described herein. The processor 480 and/or other processors and modules at the UE 120 may also perform or direct, e.g., the execution of the functional blocks illustrated in FIG. 10, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
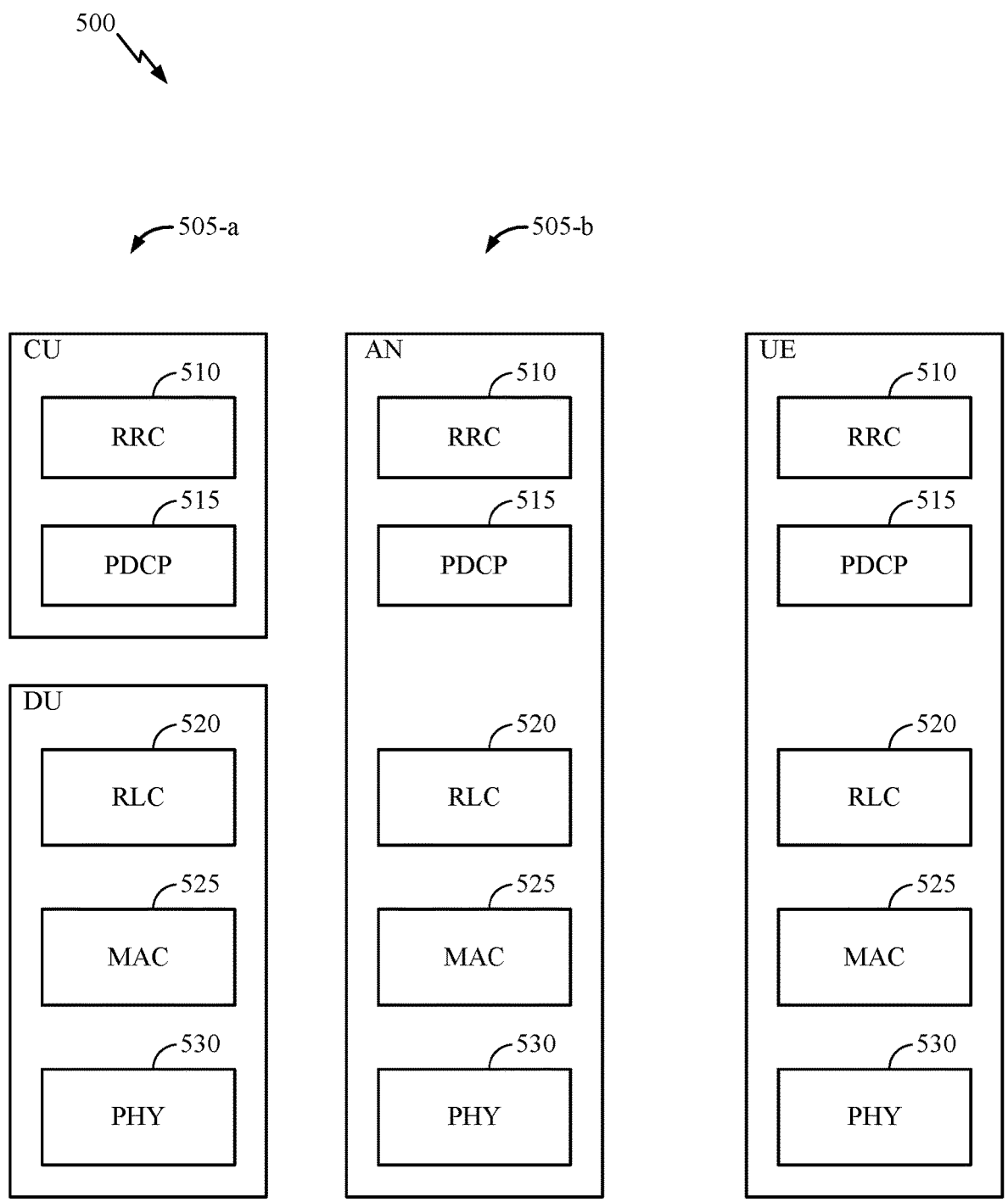
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
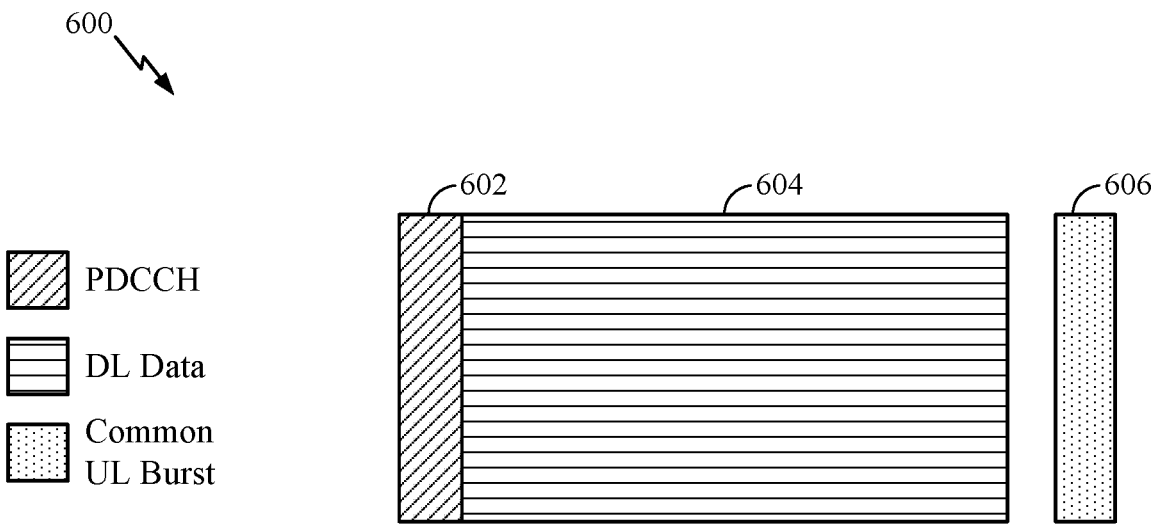
FIG. 6 illustrates an example of a downlink-centric subframe, in accordance with certain aspects of the present disclosure.

FIG. 6 is a diagram showing an example format of a DL-centric subframe 600 (e.g., also referred to as a downlink centric slot). The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may sometimes be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may be referred to as an UL burst, a common UL burst, and/or various other suitable terms. The common UL portion 606 may include feedback information corresponding to various other portions of the DL-centric subframe 600. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
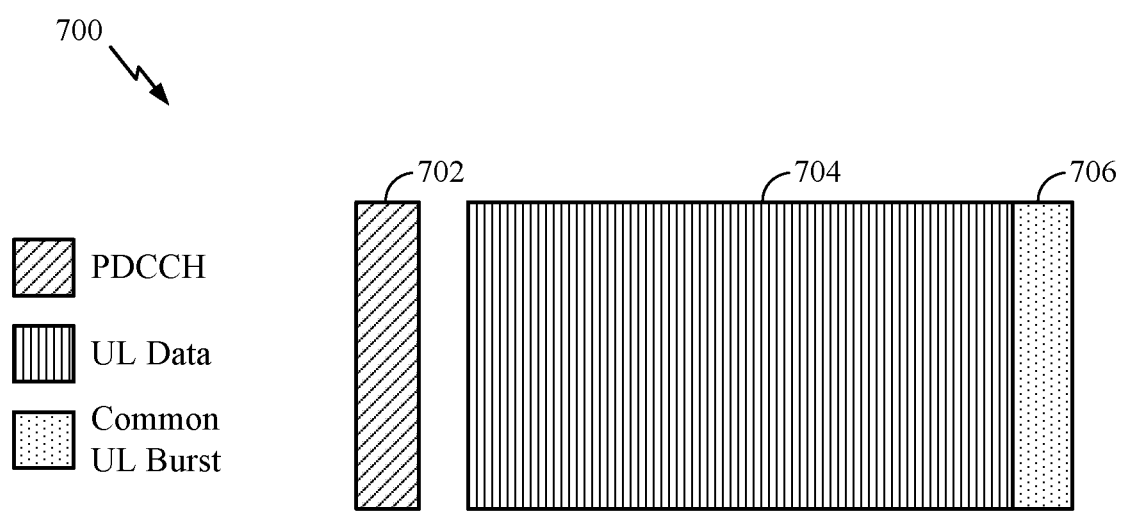
FIG. 7 illustrates an example of an uplink-centric subframe, in accordance with certain aspects of the present disclosure.

FIG. 7 is a diagram showing an example format of an UL-centric subframe 700 (e.g., also referred to as an uplink centric slot). The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a PDCCH.

As illustrated in FIG. 7, the end of the control portion 702 may be separated in time from the beginning of the UL data portion 704. This time separation may be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 8:
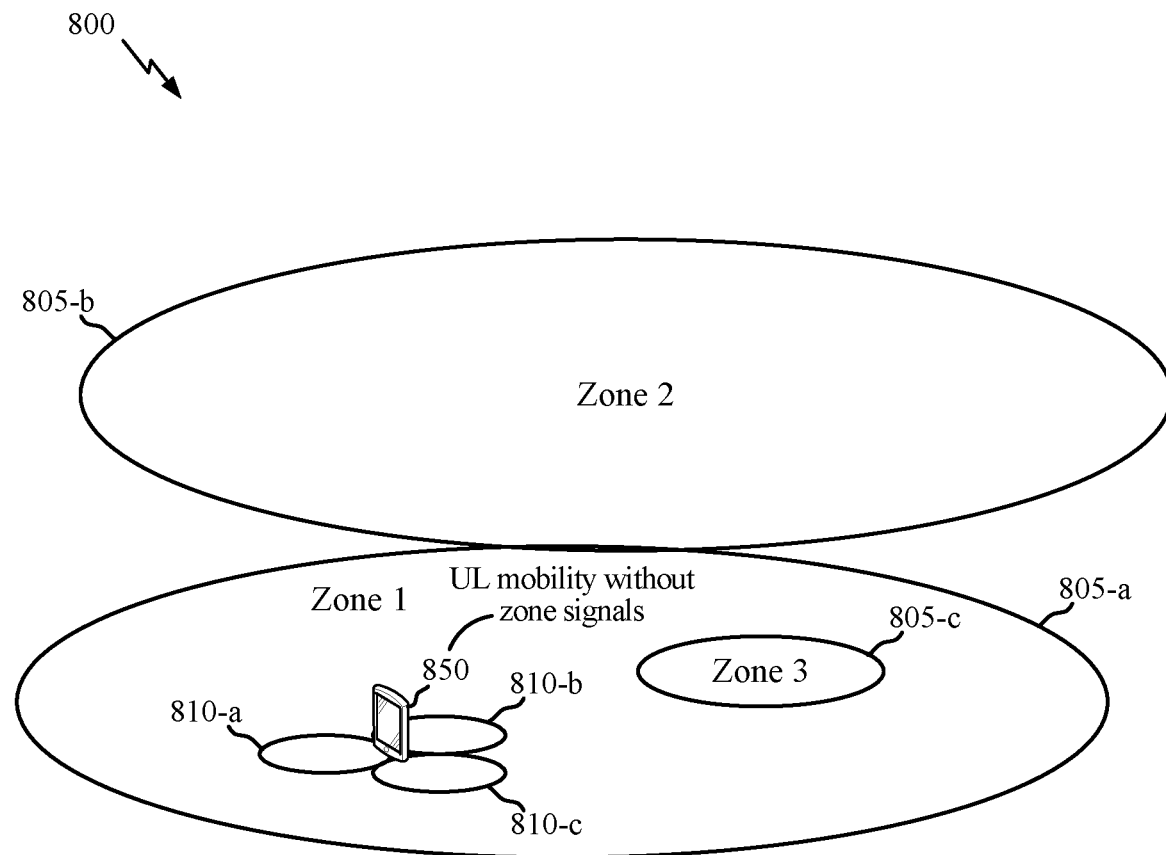
FIG. 8 illustrates an example of a wireless communication system supporting zones, in accordance with certain aspects of the present disclosure.

FIG. 8 illustrates an example of a wireless communication system 800 supporting a number of zones, in accordance with aspects of the present disclosure. The wireless communication system 800 may include a number of zones (including, e.g., a first zone 805-a (Zone 1), a second zone 805-b (Zone 2), and a third zone 805-c (Zone 3)). A number of UEs may move within or between the zones.

A zone may include multiple cells, and the cells within a zone may be synchronized (e.g., the cells may share the same timing). Wireless communication system 800 may include examples of both non-overlapping zones (e.g., the first zone 805-a and the second zone 805-b) and overlapping zones (e.g., the first zone 805-a and the third zone 805-c). In some examples, the first zone 805-a and the second zone 805-b may each include one or more macro cells, micro cells, or pico cells, and the third zone 805-c may include one or more femto cells.

By way of example, the UE 850 is shown to be located in the first zone 805-a. If the UE 850 is operating with a radio resource configuration associated with transmitting pilot signals using a common set of resources, such as an RRC common state, the UE 850 may transmit a pilot signal using a common set of resources. Cells (e.g., ANs, DUs, etc.) within the first zone 805-a may monitor the common set of resources for a pilot signal from the UE 850. If the UE 850 is operating with a radio resource configuration associated with transmitting pilot signals using a dedicated set of resource, such as an RRC dedicated state, the UE 850 may transmit a pilot signal using a dedicated set of resources. Cells of a monitoring set of cells established for the UE 850 within the first zone 805-a (e.g., a first cell 810-a, a second cell 810-b, and a third cell 810-c) may monitor the dedicated set of resources for the pilot signal of the UE 850.

Figure 9:
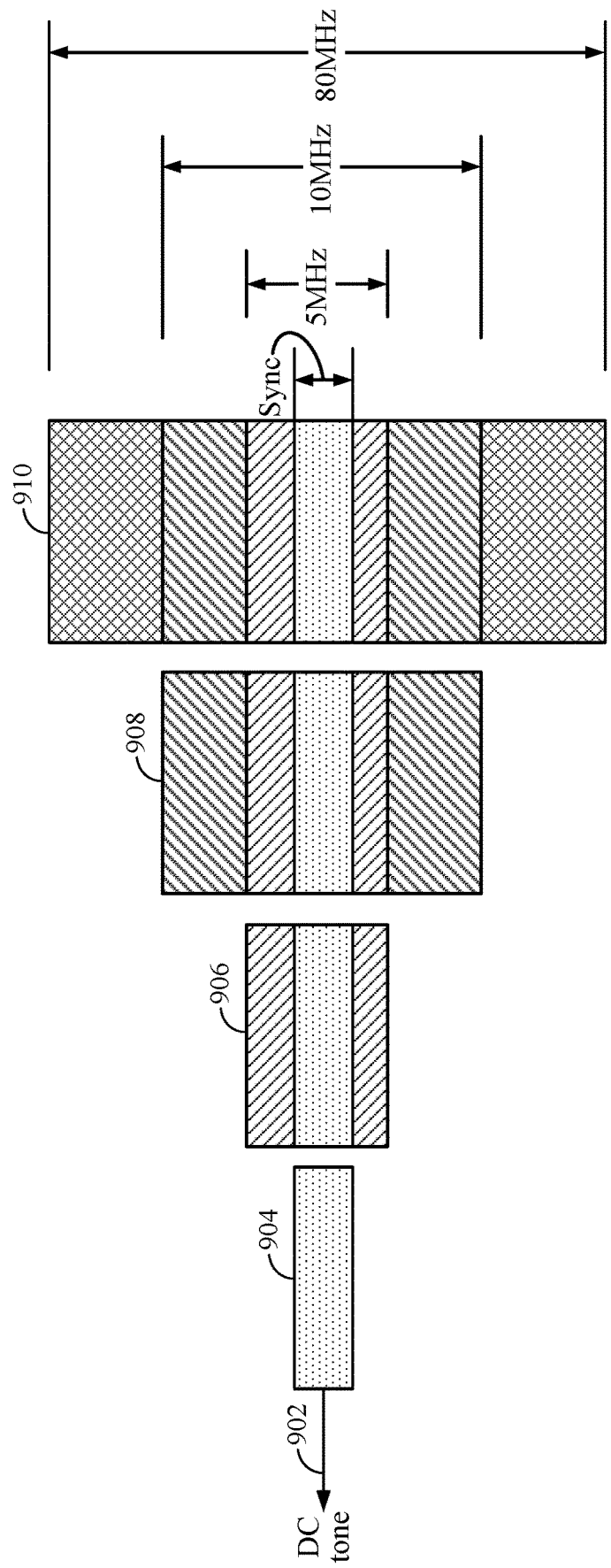
FIG. 9 illustrated an example synchronization channel centered around a DC tone.

Example Synchronization and Broadcast Channel Design With Flexible Bandwidth Allocations As illustrated in FIG. 9, in certain radio access technology (RAT) networks, such as long term evolution (LTE), the synchronization channel 904 (e.g., carrying primary synchronization signal (PSS), secondary synchronization signal (SSS), and/or physical broadcast channel (PBCH)) is centered around the DC tone 902 (also referred to as the DC subcarrier) of the system bandwidth. The DC tone is a null tone at the center of the system bandwidth. Thus, by detecting the null tone, the user equipment (UE) may be able to detect the center of the system bandwidth. Thus, if the UE knows signals are centered around the DC tone, the UE can detect those signals based on the detection of the DC tone. The synchronization channel 904 may carry some system information.

In such systems, when the UE starts initial acquisition, the UE searches with a channel raster granularity (e.g., 100 KHz) to determine the presence of synchronization signals (e.g., PSS and SSS). A reference signal 906, such as the cell-specific reference signal (CRS) sequence may be centered with respect to DC tone 902. This allows the UE to determine the CRS sequence before it acquires downlink system bandwidth information in PBCH. The CRS can be used to demodulate the PBCH, which is also centered around the DC tone. Once the UE receives the PBCH carrying system information such as the downlink bandwidth, the UE can use that information to perform a random access channel (RACH) procedure with the cell. As shown in FIG. 9, the RS may be centered around the DC tone for various system bandwidths, such as 5 MHz (RS 906), 10 MHz (RS 908), or 80 MHz (RS 910). In other systems (e.g., NR), information on bandwidth of the downlink channel or bandwidth-part may be directly carried on the PBCH, and/or the PBCH may carry pointers to system information blocks (SIBs), or other messages to be read later by the UE, which may carry this information.

In some cases, however, the synchronization channel and reference signal may not be centered around the DC tone. In NR applications, to minimize UE initial search complexity, the UE may search with a channel raster with a much coarser granularity compared to the "normal" channel raster may be used. For example, the UE may search for the synchronization channel with a 1 MHz raster while the channel raster is with 100 KHz. The finer channel raster preserves the flexibility to deploy the NR system in different geographic locations subject to different locations of available spectrum, while the coarse synchronization raster limits the search complexity. With unlicensed or shared spectrum, the system bandwidth could be wider than the channel sensing granularity. For example, the system bandwidth could be 80 MHz while the channel sensing is per 20 MHz. In order for UE to acquire the system when a node does not have full 80 Mhz channel availability, the synchronization channel could be transmitted on each 20 MHz. In narrowband Internet-of-Things (NB-IOT) applications, a fraction of the downlink bandwidth is typically used to transmit NB-IOT signal. In these scenarios, the synchronization channel may not be centered with respect to the DC tone of system bandwidth.

Aspects of the present disclosure provide flexible synchronization channel and PBCH designs, for example, that may allow synchronization channels that are not centered around DC tone, but still allow the UE to efficiently detect the synchronization channel, read the PBCH, and determine system bandwidth.

Figure 10:
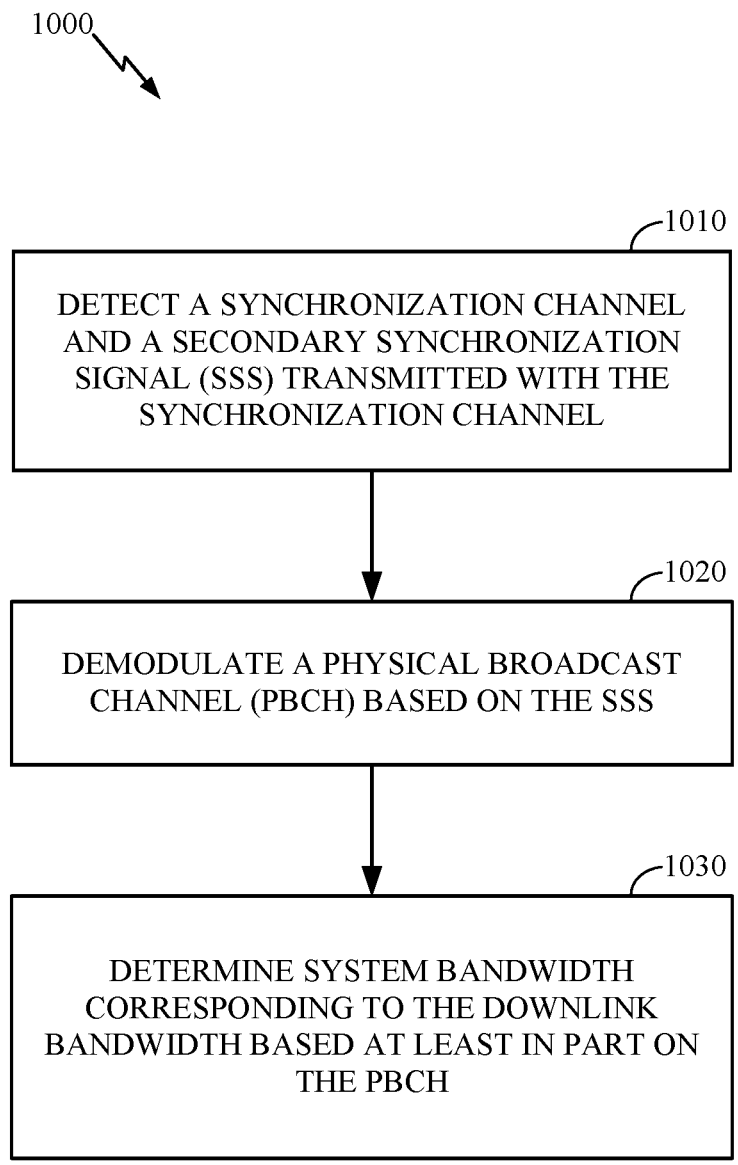
FIG. 10 is a flow diagram illustrating example operations that may be performed by a user equipment (UE) for demodulating a physical broadcast channel (PBCH) based on the a secondary synchronization signal (SSS) to obtain system information, in accordance with certain aspects of the present disclosure.

FIG. 10 is a flow diagram illustrating example operations 1000 for wireless communications. Operations 1000 may be performed, for example, by a UE (e.g., UE 120), in accordance with aspects of the present disclosure. While not shown, certain aspects of the present disclosure also provide a method for wireless communications by a base station that may be considered complementary to the UE operations 1000 above (e.g., for generating the synchronization and PBCH channels detected and read by the UE).

The operations 1000 begin, at 1010, by detecting a synchronization channel and a secondary synchronization signal (SSS) transmitted with the synchronization channel. At 1020, the UE demodulates a physical broadcast channel (PBCH) based on the SSS. At 1030, the UE determines system bandwidth corresponding to the downlink bandwidth based on at least in part on the PBCH. For example, the UE can determine the downlink bandwidth directly based on system information in the PBCH, or the UE can determine the downlink bandwidth based on pointers in the PBCH to a later signal (e.g., a SIB or RRC message) carrying the downlink bandwidth information.

Figure 11:
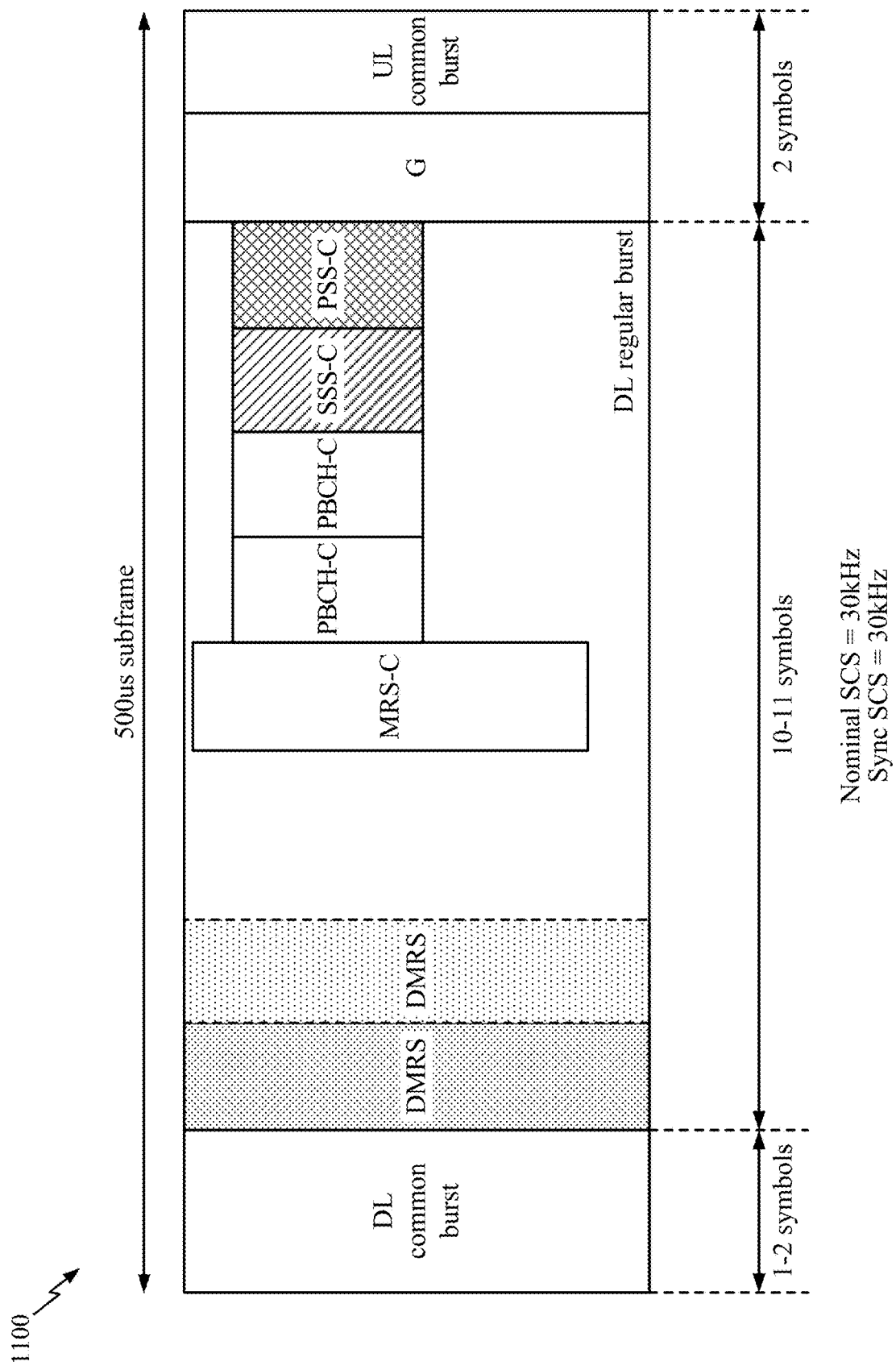
FIG. 11 illustrates an example synchronization channel design, in accordance with certain aspects of the present disclosure.

FIG. 11 illustrates one example of a synchronization channel design (e.g., referred to as synchronization signal (SS) block). As shown in FIG. 11, the synchronization channel (or block) 1100 includes one PSS symbol, one SSS symbol, and 2 PBCH symbols in the slot (e.g., 500 µs). The illustrated SS block (or subframe) example also includes a one-symbol measurement reference signal (MRS) (e.g., shown as MRS-C). The illustrated SS block (or subframe) example also includes DL common burst, DMRS, UL common burst, and guard period (G) portions (as described above with reference to FIGS. 6 and 7). After receiving minimum system information in the PBCH, the UE may receive remaining system information (RMSI), for example, in a physical downlink shared channel (PDSCH). Since in NR, the signals (e.g., signals within a SS block) may not be centered around the DC tone, techniques and synchronization channel design are desirable that allow the UE to detect the PBCH, before obtaining DL bandwidth information.

Example SSS or Dedicated RS Demodulated PBCH

According to certain aspects, one solution is to allow for PBCH demodulation with a reference signal, such as SSS or some other dedicated RS for PBCH. The SSS or other RS may not depend on the downlink bandwidth or the location of the synchronization channel within the downlink bandwidth.

According to certain aspects, the location of the dedicated RS may be fixed relative to that of the synchronization channel. In one example, the dedicated RS may be located within the synchronization channel bandwidth. Once the UE acquires downlink bandwidth information from the PBCH, an MRS sequence can be determined (e.g., and generated) accordingly.

Example MRS Demodulated PBCH

Figure 12:
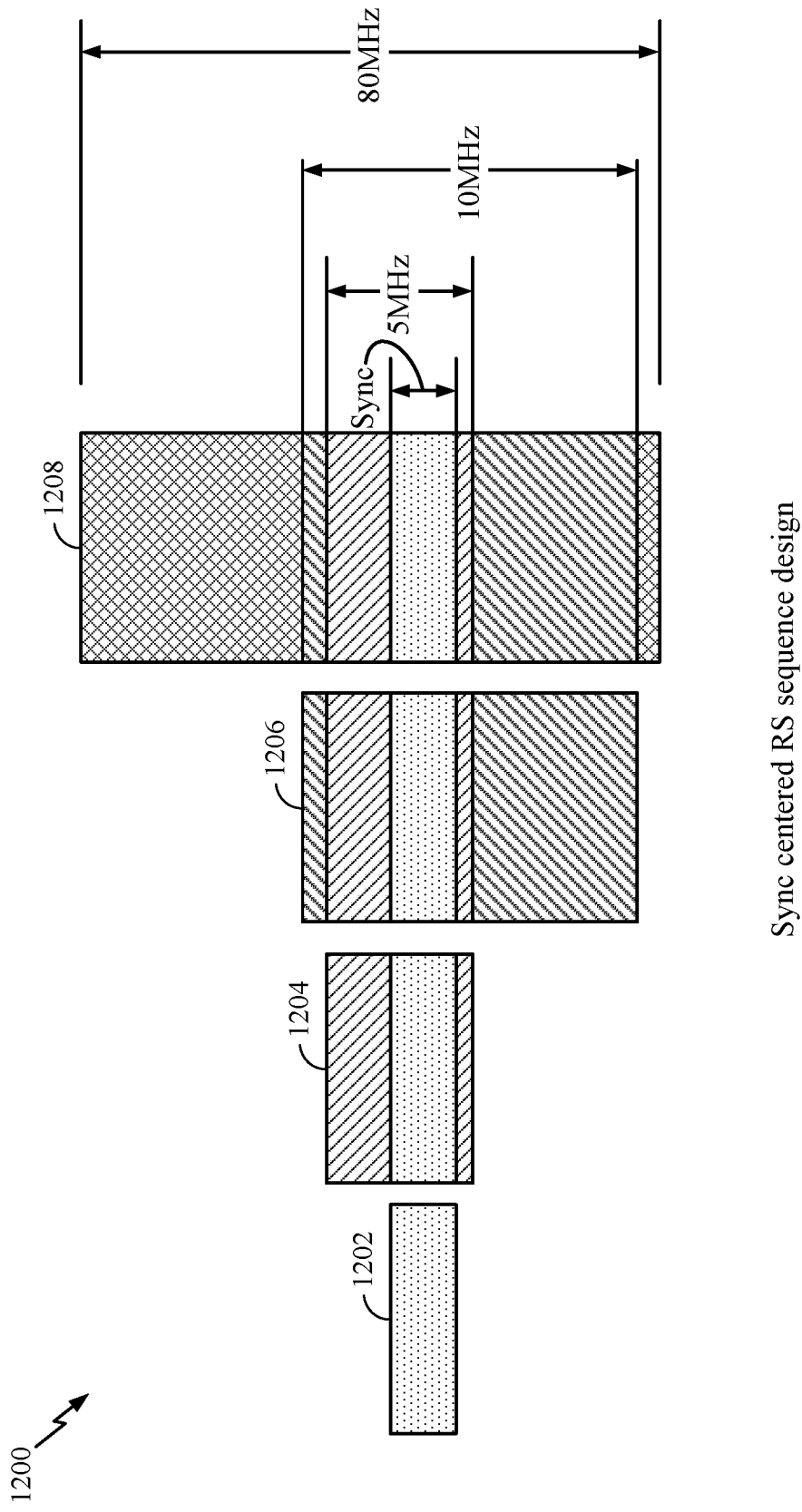
FIG. 12. Illustrates an example reference signal (RS) design centered around a synchronization channel that is not centered around a DC tone, in accordance with certain aspects of the present disclosure.

According to certain aspects, a PBCH may be demodulated with an MRS (e.g., in addition to the SSS). As illustrated in FIG. 12, the synchronization channel 1202 is not centered around the DC tone. The MRS may have a wider bandwidth (e.g., 5 MHz for MRS 1204, 10 MHz for MRS 1206, and 80 MHz for MRS 1208) than the synchronization channel 1202 and PBCH.

The UE may also use the MRS to perform measurements after initial acquisition. In some cases, the MRS sequence may always be centered with respect to the synchronization channel, but independent of the actual synchronization channel location or system bandwidth, as shown in FIG. 12.

Figure 13:
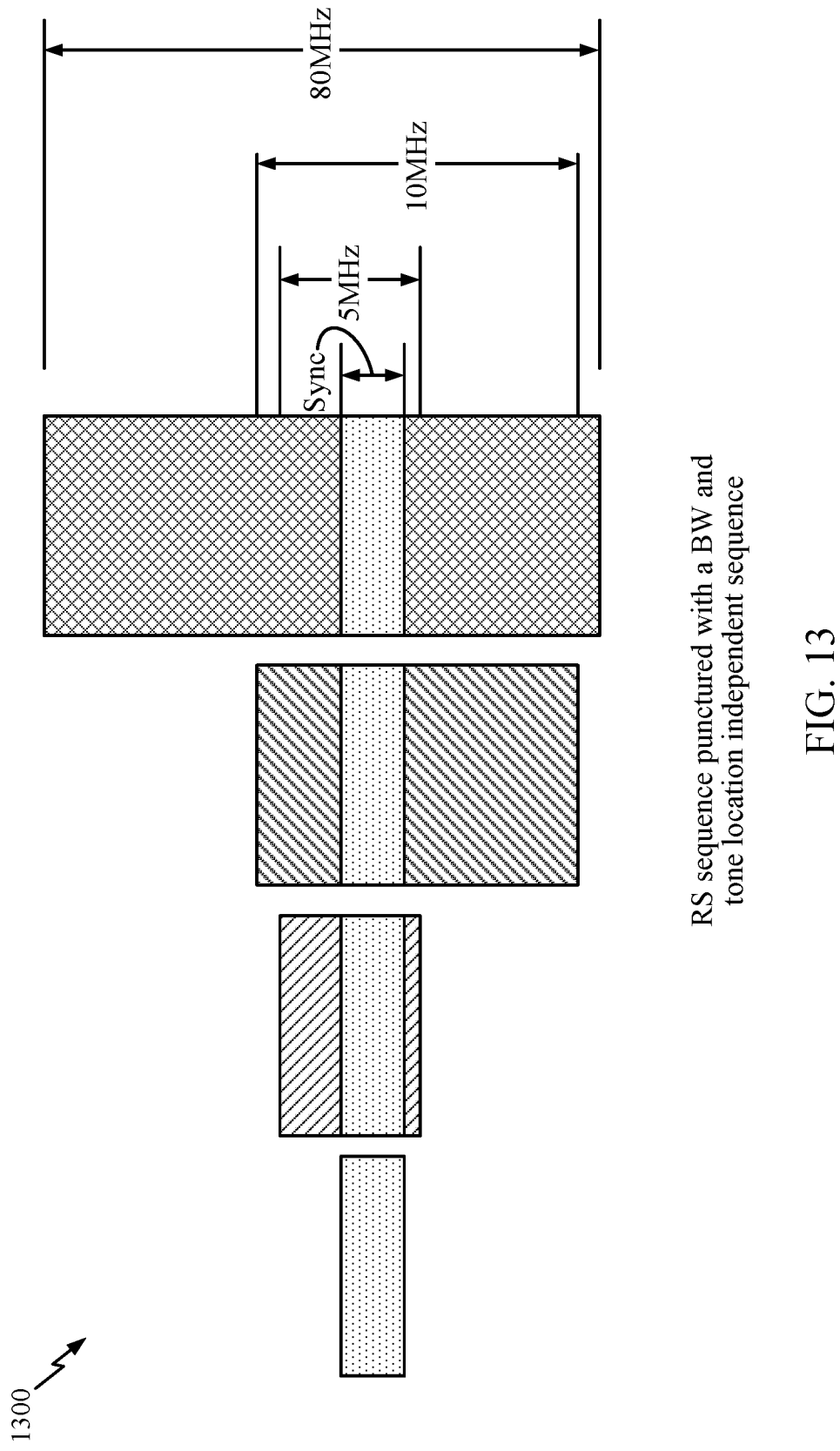
FIG. 13 illustrates an example punctured RS and synchronization channel design, in accordance with certain aspects of the present disclosure.

In some cases, the MRS sequence may be based on the system bandwidth, however, portions of the MRS spanning into the synchronization region may be overwritten (e.g., punctured) with another sequence which does not depend on the synchronization channel location or system bandwidth as shown in FIG. 13.

Example Synchronization Channel Offset Indication

Figure 14:
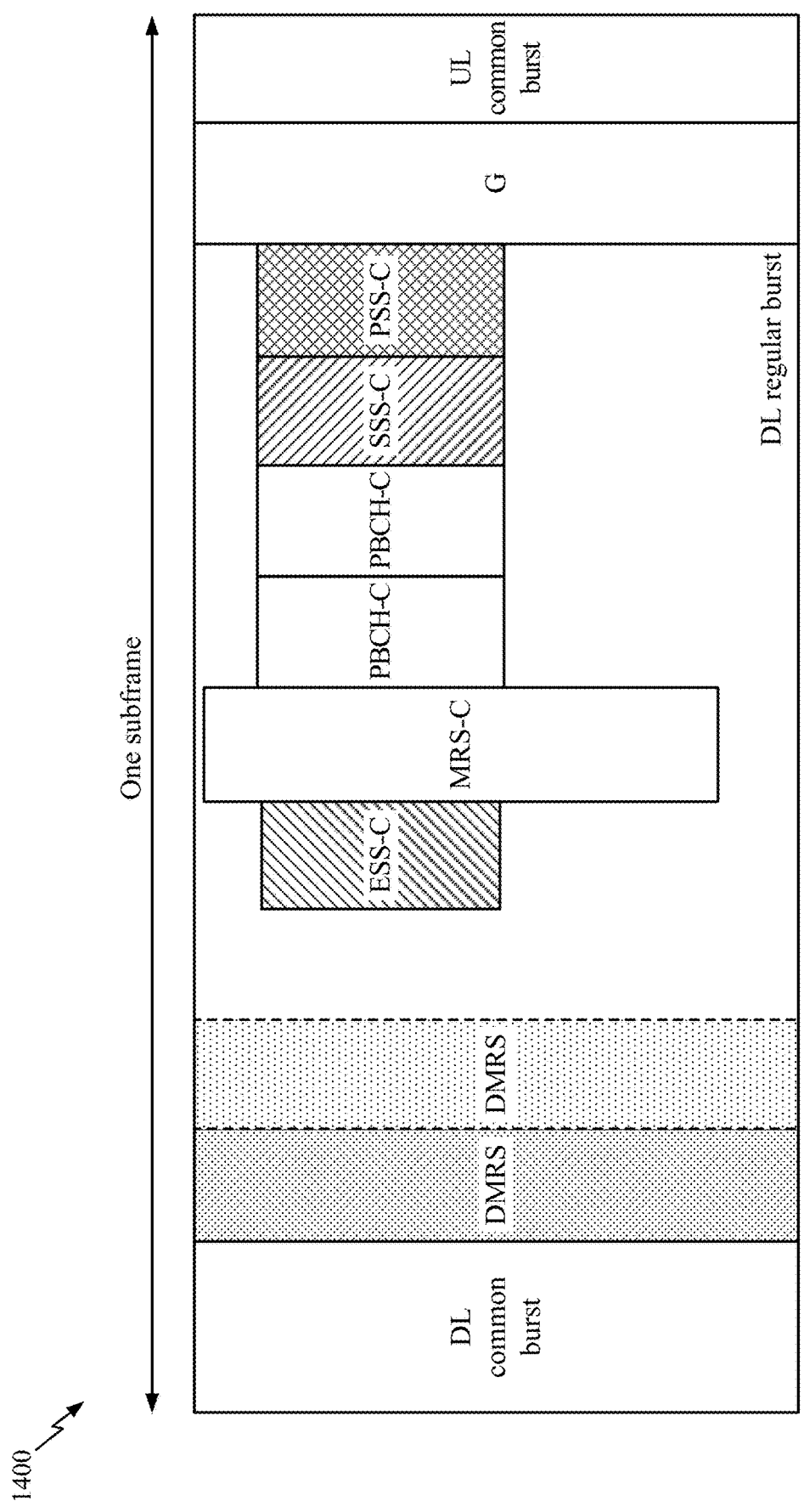
FIG. 14 illustrates an example synchronization channel design including an indication of the synchronization channel offset, in accordance with certain aspects of the present disclosure.

According to certain aspects, the synchronization channel offset may be signaled to the UE. For example, the frequency offset of the synchronization channel with respect to the DC tone may be indicated. As shown in FIG. 14, the indication of the synchronization channel offset may be signaled in the ESS (e.g., enhanced synchronization signal) channel. The UE may use the synchronization channel offset indication to determine the location of the synchronization channel to obtain the RS sequence used for PBCH demodulation.

Alternatively, the synchronization channel offset can be signaled to the UE implicitly, via the selection of PSS/SSS hypothesis. In other words, different combinations of PSS/SSS may be selected to signal different synchronization channel offsets. In this case, the UE may obtain the synchronization channel offset via PSS/SSS detection and use the offset to derive the RS sequence (e.g., to detect the RS) for use in PBCH demodulation.

Example Multiple Hypotheses PBCH Decoding

In some cases, the signaling techniques described above may provide only partial information regarding the PBCH location. To resolve (e.g., determine) any information about PBCH location that remains incomplete after the use of any of those techniques, the UE may attempt to decode multiple PBCH hypotheses. As an example, to reduce complexity of ESS-C or SSS detection, only partial information related to the synchronization channel offset may be signaled to the UE and multiple PBCH locations may be possible candidates.

As another example, the relative offset between the synchronization channel and the PBCH or between the synchronization channel and the MRS may not be completely specified. Considering the example case of unlicensed spectrum with 4 groups of 20 MHz spectrum, the synchronization channel may be repeated only in a subset of the groups. In such cases, the UE may attempt to decode the corresponding possible PBCH candidates.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 10-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    detecting a synchronization channel and a secondary synchronization signal (SSS) transmitted with the synchronization channel by searching for one or more synchronization channels according to a synchronization channel raster, that is not centered around a direct current (DC) tone of a system bandwidth, the synchronization channel raster having a coarser granularity than a channel raster for other channels in the system bandwidth;
    receiving a reference signal for demodulation (DMRS), other than a cell-specific reference signal, wherein a sequence of the DMRS is independent of at least one of a downlink bandwidth or a location of the synchronization channel within the system bandwidth;
    demodulating a physical broadcast channel (PBCH) transmitted in the synchronization channel based on at least one of the DMRS and the SSS; and
    determining the system bandwidth corresponding to the downlink bandwidth based at least in part on the PBCH.

2. The method of claim 1, wherein a frequency location of the DMRS is within the synchronization channel.

3. The method of claim 1, wherein the DMRS is a channel state information reference signal (CSI-RS).

4. The method of claim 1, wherein demodulating the PBCH comprises:
  determining multiple PBCH candidates based on detection of the synchronization channel; and
  evaluating the multiple PBCH candidates.

5. The method of claim 1, wherein:
  the synchronization channel comprises a secondary synchronization signal (SSS) with at least one symbol,
  the PBCH comprises two symbols, and
  the synchronization channel further comprises a one-symbol primary synchronization signal (PSS) time-division multiplexed (TDM) with the one-symbol SSS and the two-symbol PBCH.

6. The method of claim 1, further comprising:
  after demodulating the PBCH, receiving remaining system information (RMSI), not included in the PBCH, in a physical downlink shared channel (PDSCH).

7. An apparatus for wireless communications, comprising:
  means for detecting a synchronization channel and a synchronization signal (SSS) transmitted with the synchronization channel by searching for one or more synchronization channels according to a synchronization channel raster that is not centered around a direct current (DC) tone of a system bandwidth, the synchronization channel raster having a coarser granularity than a channel raster for other channels in the system bandwidth;
  means for receiving a reference signal for demodulation (DMRS), other than a cell-specific reference signal, wherein a sequence of the DMRS is independent of at least one of: a downlink bandwidth or location of the synchronization channel within the system bandwidth;
  means for demodulating a physical broadcast channel (PBCH) transmitted in the synchronization channel based on at least one of the DMRS and the SSS; and
  means for determining the system bandwidth corresponding to the downlink bandwidth based at least in part on the PBCH.

8. The apparatus of claim 7, wherein a frequency location of the DMRS is within the synchronization channel.

9. The apparatus of claim 7, wherein the DMRS is a channel state information reference signal (CSI-RS).

10. The apparatus of claim 7, wherein means for demodulating the PBCH comprises:
  means for determining multiple PBCH candidates based on detection of the synchronization channel; and
  means for evaluating the multiple PBCH candidates.

11. The apparatus of claim 7, wherein:
  the synchronization channel comprises a secondary synchronization signal (SSS) having at least one symbol,
  the PBCH comprises two symbols, and
  the synchronization channel further comprises a one-symbol primary synchronization signal (PSS) time-division multiplexed (TDM) with the one-symbol SSS and the two-symbol PBCH.

12. The apparatus of claim 7, further comprising:
  means for receiving remaining system information (RMSI), not included in the PBCH, in a physical downlink shared channel (PDSCH) after demodulating the PBCH.

13. An apparatus for wireless communications, comprising:
  at least one processor coupled with a memory and configured to:
    detect a synchronization channel and a secondary synchronization signal (SSS) transmitted with the synchronization channel by searching for one or more synchronization channels according to a synchronization channel raster that is not centered around a direct current (DC) tone of a system bandwidth, the synchronization channel raster having a coarser granularity than a channel raster for other channels in the system bandwidth; and
  a receiver configured to receive a reference signal for demodulation (DMRS), other than a cell-specific reference signal, wherein a sequence of the DMRS is independent of at least one of: a downlink bandwidth or a location of the synchronization channel within the system bandwidth;
  wherein the at least one processor is further configured to:
    demodulate a physical broadcast channel (PBCH) transmitted in the synchronization channel based on at least one of the DMRS and the SSS; and
    determine the system bandwidth corresponding to the downlink bandwidth based at least in part on the PBCH.

14. The apparatus of claim 13, wherein a frequency location of the reference signal is within the synchronization channel.

15. The apparatus of claim 13, wherein:
  the synchronization channel comprises a secondary synchronization signal (SSS) with at least one symbol,
  the PBCH comprises two symbols, and
  the synchronization channel further comprises a one-symbol primary synchronization signal (PSS) time-division multiplexed (TDM) with the one-symbol SSS and the two-symbol PBCH.

16. A non-transitory computer readable medium having computer executable code stored thereon for wireless communications, comprising:
  code for detecting a synchronization channel and a secondary synchronization signal (SSS) transmitted with the synchronization channel by searching for one or more synchronization channels according to a synchronization channel raster that is not centered around a direct current (DC) tone of a system bandwidth, the synchronization channel raster having a coarser granularity than a channel raster for other channels in the system bandwidth;
  code for receiving a reference signal for demodulation (DMRS), other than a cell-specific reference signal, wherein a sequence of the DMRS is independent of at least one of: a downlink bandwidth or a location of the synchronization channel within the system bandwidth;
  code for demodulating a physical broadcast channel (PBCH) transmitted in the synchronization channel based on at least one of the DMRS and the SSS; and
  code for determining the system bandwidth corresponding to the downlink bandwidth based at least in part on the PBCH.

17. The non-transitory computer readable medium of claim 16, wherein a frequency location of the DMRS is within the synchronization channel.

18. The non-transitory computer readable medium of claim 16, wherein:
  the synchronization channel comprises a secondary synchronization signal (SSS) with at least one symbol,
  the PBCH comprises two symbols, and
  the synchronization channel further comprises a one-symbol primary synchronization signal (PSS) time-division multiplexed (TDM) with the one-symbol SSS and the two-symbol PBCH.

19. A method for wireless communications by a user equipment (UE), comprising:
- detecting a synchronization channel and a secondary synchronization signal (SSS) transmitted with the synchronization channel, wherein the synchronization signal is not centered around a direct current (DC) tone of a system bandwidth;
- receiving a reference signal for demodulation (DMRS) other than a cell-specific reference signal, with a sequence of the DMRS being independent of at least one of: a downlink bandwidth or a location of the synchronization channel within the system bandwidth, and a frequency location of the DMRS being fixed with respect to a location of the synchronization channel;
- demodulating a physical broadcast channel (PBCH) transmitted in the synchronization channel based on at least one of the DMRS and the SSS; and
- determining the system bandwidth corresponding to the downlink bandwidth based at least in part on the PBCH.

20. An apparatus for wireless communication, comprising:
- means for detecting a synchronization channel and a secondary synchronization signal (SSS) transmitted with the synchronization channel, wherein the synchronization signal is not centered around a direct current (DC) tone of a system bandwidth;
- means for receiving a reference signal for demodulation (DMRS), other than a cell-specific reference signal, with a sequence of the DMRS being independent of at least one of: a downlink bandwidth or a location of the synchronization channel within the system bandwidth, and a frequency location of the DMRS being fixed with respect to a location of the synchronization channel;
- means for demodulating a physical broadcast channel (PBCH) transmitted in the synchronization channel based on at least one of the DMRS and the SSS; and
- means for determining the system bandwidth corresponding to the downlink bandwidth based at least in part on the PBCH.

21. An apparatus for wireless communication, comprising:
- at least one processor coupled with a memory and configured to detect a synchronization channel and a secondary synchronization signal (SSS) transmitted with the synchronization channel, wherein the synchronization signal is not centered around a direct current (DC) tone of a system bandwidth; and
- a receiver configured to receive a reference signal for demodulation (DMRS), other than a cell-specific reference signal, with a sequence of the DMRS being independent of at least one of: a downlink bandwidth or a location of the synchronization channel within the system bandwidth, and a frequency location of the DMRS being fixed with respect to a location of the synchronization channel;
- wherein the at least one processor is further configured to:
  - demodulate a physical broadcast channel (PBCH) transmitted in the synchronization channel based on at least one of the DMRS and the SSS; and
  - determine the system bandwidth corresponding to the downlink bandwidth based at least in part on the PBCH.

22. A non-transitory computer readable medium having computer executable code stored thereon for wireless communication by a user equipment (UE), comprising:
- code for detecting a synchronization channel and a secondary synchronization signal (SSS) transmitted with the synchronization channel, wherein the synchronization signal is not centered around a direct current (DC) tone of a system bandwidth;
- code for receiving a reference signal for demodulation (DMRS), other than a cell-specific reference signal, with a sequence of the DMRS being independent of at least one of: a downlink bandwidth or a location of the synchronization channel within the system bandwidth, and a frequency location of the DMRS being fixed with respect to a location of the synchronization channel;
- code for demodulating a physical broadcast channel (PBCH) transmitted in the synchronization channel based on at least one of the DMRS and the SSS; and
- code for determining the system bandwidth corresponding to the downlink bandwidth based at least in part on the PBCH.

\* \* \* \* \*